US012345569B2

(12) United States Patent
Mazzillo

(10) Patent No.: US 12,345,569 B2
(45) Date of Patent: Jul. 1, 2025

(54) SPAD-BASED PHOTODETECTORS

(71) Applicant: ams-OSRAM International GmbH, Regensburg (DE)

(72) Inventor: Massimo Cataldo Mazzillo, Hamburg (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 446 days.

(21) Appl. No.: 17/797,457

(22) PCT Filed: Feb. 5, 2021

(86) PCT No.: PCT/EP2021/052817
§ 371 (c)(1),
(2) Date: Aug. 4, 2022

(87) PCT Pub. No.: WO2021/156444
PCT Pub. Date: Aug. 12, 2021

(65) Prior Publication Data
US 2023/0080013 A1    Mar. 16, 2023

(30) Foreign Application Priority Data
Feb. 6, 2020    (DE) .................. 10 2020 201 452.3

(51) Int. Cl.
*G01J 1/42*    (2006.01)
*G01J 1/44*    (2006.01)

(52) U.S. Cl.
CPC ..... *G01J 1/4228* (2013.01); *G01J 2001/4466* (2013.01)

(58) Field of Classification Search
CPC .... G01J 1/02; G01J 1/0228; G01J 1/04; G01J 1/0437; G01J 1/16; G01J 1/1626;
(Continued)

(56) References Cited

U.S. PATENT DOCUMENTS 5,491,548 A    2/1996   Bell et al.
11,610,927 B2*   3/2023   Lan ............... H01L 27/14683
(Continued)

FOREIGN PATENT DOCUMENTS

CN    110196106 A    9/2019
WO    2014202995 A1   12/2014

OTHER PUBLICATIONS

International Search Report issued for the corresponding international application No. PCT/EP2021/052817, dated Jul. 16, 2021, 5 pages (for informational purposes only).
(Continued)

*Primary Examiner* — John R Lee
(74) *Attorney, Agent, or Firm* — Viering, Jentschura & Partner mbB

(57) ABSTRACT

An integrated photodetecting optoelectronic semiconductor component configured to deliver an output signal indicative of the intensity of light irradiating the component. The component may include a SPAD-based main detection device configured to detect incoming photons and to deliver an output signal based on the detected photons. The component may also include a SPAD-based reference detection device proximate to the main detection device where the reference detection device has the same electro-optical behaviour as the main detection device, is configured to detect incoming photons, configured to deliver a reference signal based on the detected photons, and has a light inlet for incoming photons. The component may also include a neutral density filtering device and a controller configured to determine a nominal output signal, compare the nominal output signal with the output signal delivered by the main detection device, and adjust an operating parameter based on the comparison.

8 Claims, 5 Drawing Sheets

(58) Field of Classification Search
CPC .... G01J 1/24; G01J 1/42; G01J 1/4228; G01J 1/44; G01J 2001/1663; G01J 2001/245; G01J 2001/4413; G01J 2001/442; G01J 2001/444; G01J 2001/4446; G01J 2001/448; G01J 2001/481; H01L 27/144; H01L 27/1443; H01L 27/146; H01L 27/14601; H01L 27/14609; H01L 31/107; H01L 31/1075; H01L 31/14; H01L 31/145

See application file for complete search history.

(56) References Cited

U.S. PATENT DOCUMENTS

| | | | | |
|---|---|---|---|---|
| 11,973,093 | B2* | 4/2024 | King | H01L 27/14612 |
| 12,062,671 | B2* | 8/2024 | Wang | H01L 27/1464 |
| 12,099,146 | B2* | 9/2024 | Lee | H01L 31/022466 |
| 12,132,066 | B2* | 10/2024 | Lan | H01L 27/14683 |
| 2014/0291481 | A1* | 10/2014 | Zhang | H01L 31/107 257/431 |
| 2015/0325737 | A1 | 11/2015 | Mazzillo et al. | |
| 2018/0027196 | A1 | 1/2018 | Yang et al. | |
| 2018/0033896 | A1 | 2/2018 | Morimoto et al. | |
| 2018/0374889 | A1 | 12/2018 | Cao et al. | |
| 2019/0320128 | A1 | 10/2019 | Lee | |
| 2020/0105812 | A1* | 4/2020 | Sze | H01L 27/14643 |
| 2023/0080013 | A1* | 3/2023 | Mazzillo | G01J 1/4228 356/222 |
| 2024/0120427 | A1* | 4/2024 | Lee | G01S 7/4816 |
| 2024/0213390 | A1* | 6/2024 | Lim | H01L 31/02027 |
| 2024/0241229 | A1* | 7/2024 | Lee | H01L 31/107 |
| 2024/0243213 | A1* | 7/2024 | Kuo | H01L 31/107 |
| 2024/0319340 | A1* | 9/2024 | Lee | G01S 7/4816 |
| 2024/0363653 | A1* | 10/2024 | Wang | H01L 31/02325 |
| 2024/0371907 | A1* | 11/2024 | Lan | H01L 27/14636 |
| 2024/0410992 | A1* | 12/2024 | Lee | H01L 31/035272 |

OTHER PUBLICATIONS

Andreas Eisele, et al. "185 MHz Count Rate, 139 dB Dynamic Range Single-Photon Avalanche Diode with Active Quenching Circuit in 130 nm CMOS Technology", Jun. 2011, 3 pages, Conference: IISW 2011, Hokkaido, Japan.

Myung-Jae Lee, et al. "A first single-photon avalanche diode fabricated in standard SOI CMOS technology with a full characterization of the device", Optics Express, pp. 13200-13209, May 2015, vol. 23, Issue 10.

Woo-Suk Sul, et al. "Guard-Ring Structures for Silicon Photomultipliers", Published in: IEEE Electron Device Letters, Published Dec. 1, 2009, pp. 41-43, vol. 31, Issue 1.

German office action issued for the corresponding German patent application No. 11 2021 000 990.7, dated Nov. 20, 2024, 10 pages (for informational purposes only).

* cited by examiner

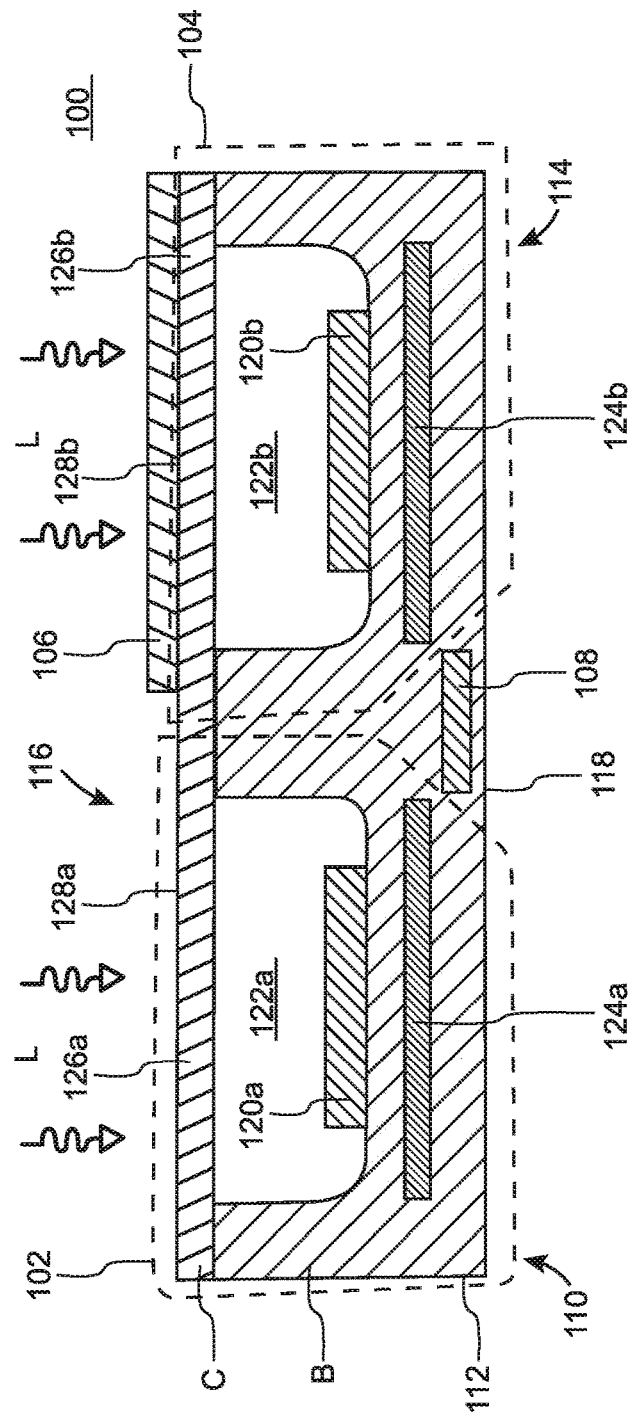
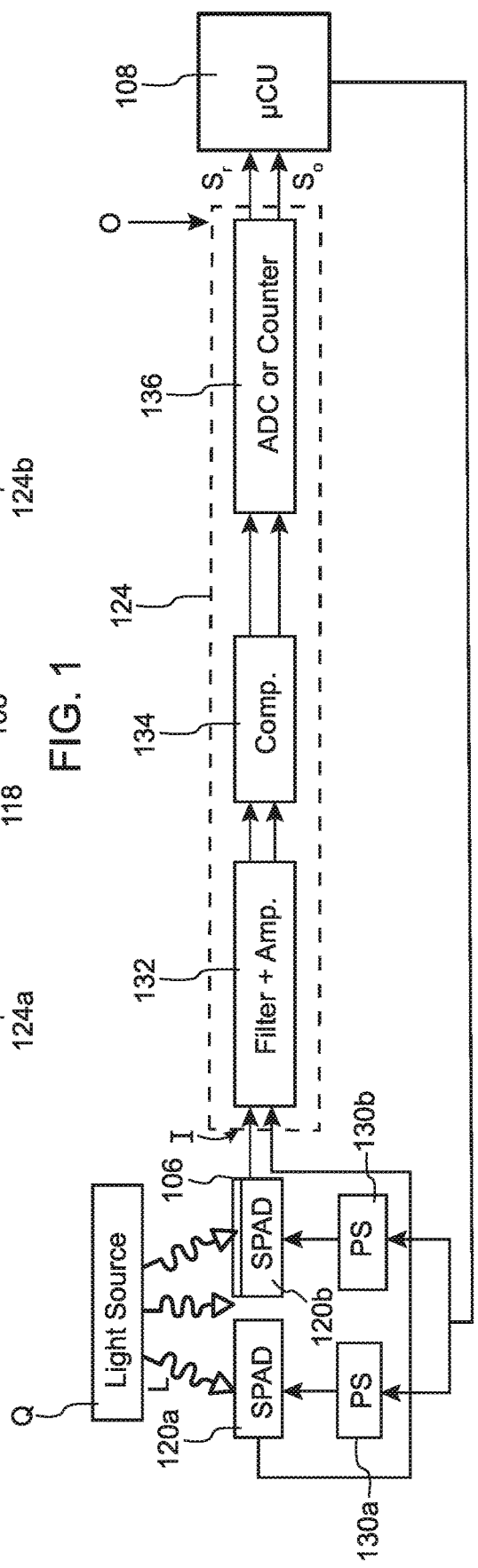
FIG. 1
FIG. 2

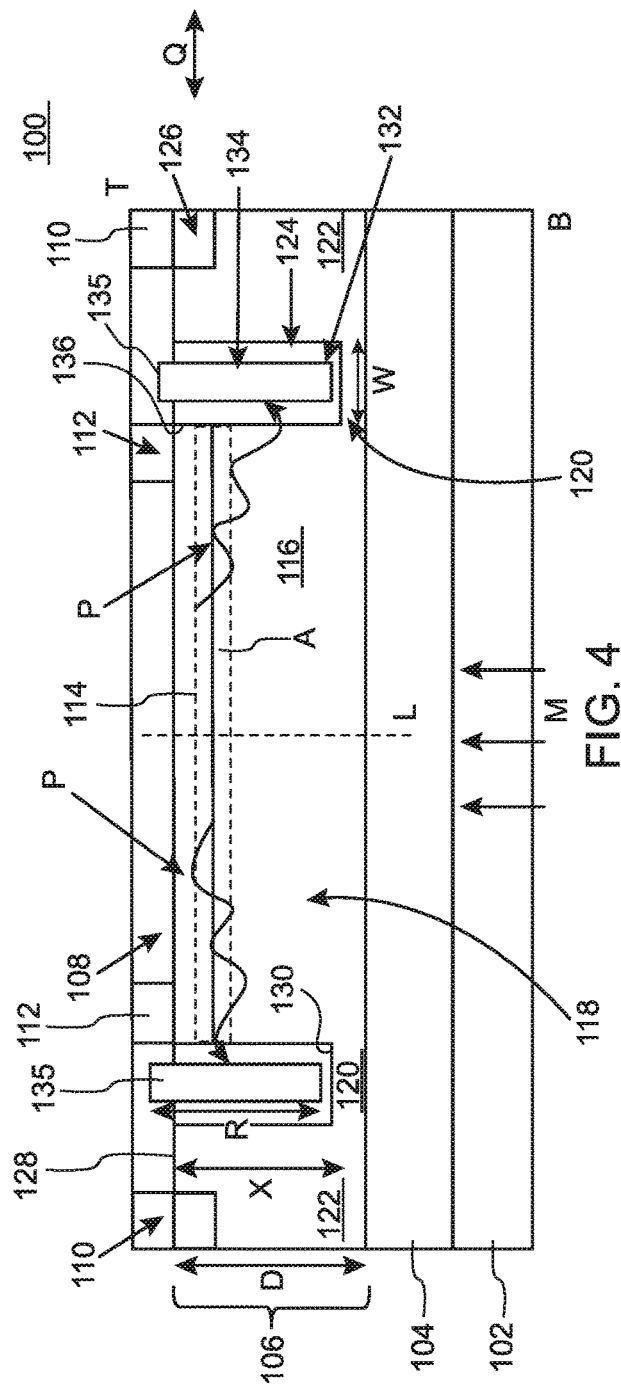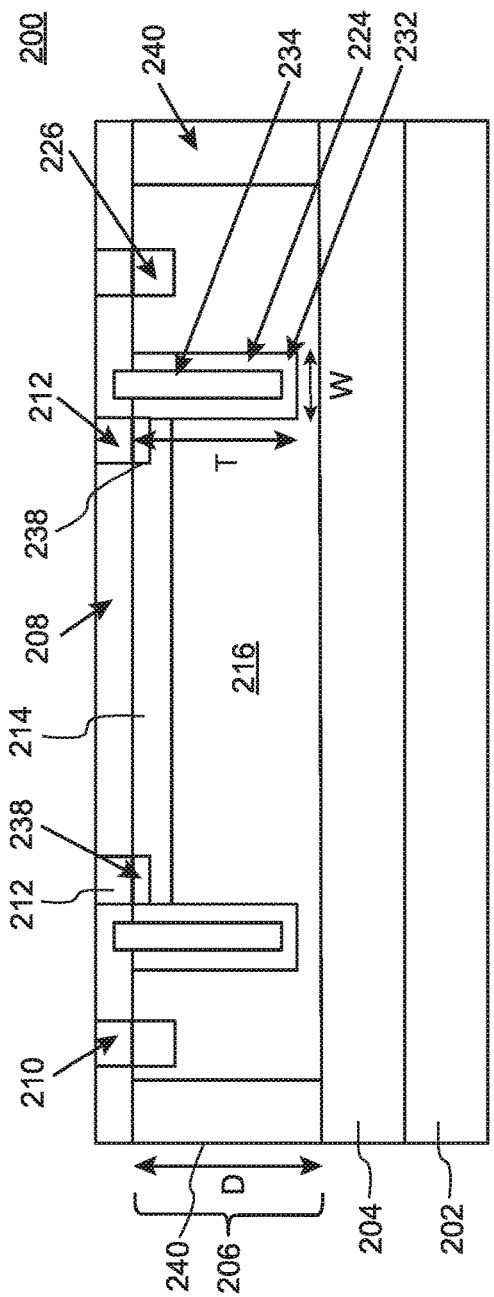

SPAD-BASED PHOTODETECTORS

CROSS-REFERENCE TO RELATED APPLICATIONS

The present application is a national stage entry according to 35 U.S.C. § 371 of PCT application No.: PCT/EP2021/052817 filed on Feb. 5, 2021; which claims priority to German patent application DE 10 2020 201 452.3, filed on Feb. 6, 2020; all of which are incorporated herein by reference in their entirety and for all purposes.

TECHNICAL FIELD

The present disclosure pertains to an integrated photodetecting optoelectronic semiconductor component and further relates to an avalanche photodiode for light detection.

BACKGROUND

Such a SPAD-based optoelectronic component is known from the article "185 *MHz Count Rate,* 139 *dB Dynamic Range Single-Photon Avalanche Diode with Active Quenching Circuit in* 130 *nm CMOS Technology*" by A. Eisele et al., which was presented at the International Image Sensor Workshop in Japan on 14/06/11 (pp. 278-281 of the conference proceedings). In the following, this article will be simply referred to as the "Eisele article".

The Eisele article focuses on the saturation problem that one encounters when operating Single-Photon Avalanche Diodes (or SPADs) under high light intensity conditions. Above a certain light intensity, SPADs are overwhelmed by the high rate of incoming photons. Under these conditions, a SPAD will fail to detect a relevant fraction of the impinging photons. The signal delivered by the SPAD saturates and is no longer an accurate measure of the light intensity.

To mitigate this problem, the Eisele article presents an improved active quenching circuit. This compact active quenching circuit reduces the dead time of the SPADs. Accordingly, the SPADs' saturation threshold is higher and they can be used for measurements at higher light intensities.

The solution presented by the Eisele article is however complicated and costly. Photodetectors built on this solution include complex active quenching circuits and are thus difficult and expensive to mass-produce.

A different approach to mitigating the saturation problem in SPADs relies on detailed algorithms and post-processing analysis. The approach uses a theoretical model of a SPAD's saturation curve to predict the SPAD's behaviour under saturation conditions. The model is used to correct the output signal provided by the saturated SPAD.

This analytical approach is however quite complex and difficult to implement because a SPAD's saturation curve depends on many factors, and in particular on the illumination conditions, which vary from one application to the next.

In view of the above, it is an objective of the present disclosure to provide a SPAD-based photodetecting optoelectronic component, which can reliably operate even under high light intensity conditions.

In an embodiment, the component should also be of a simple design and easy to mass-produce.

A further objective is to provide a SPAD-based photodetecting optoelectronic component, which can adapt to widely different illumination conditions to always provide an accurate measurement signal, irrespective of the specific application.

Such an avalanche photodiode is disclosed in the article entitled "*A first single-photon avalanche diode fabricated in standard SOI CMOS technology with a full characterization of the device*" by M. J. Lee et al, published in Optics Express, 18 May 2015, Vol. 23, No. 10, pp. 13200-13209. In the following, this article will be called the Lee article.

A first problem with avalanche photodiodes is the risk of premature edge breakdown at the edges of the avalanche region, which is due to the high electric field that needs to be maintained in the avalanche region.

A second problem arises when individual avalanche photodiodes are combined into a whole photodetecting array. Adjacent photodiodes in the array tend to suffer from optical and electrical crosstalk, which generates noise in the array's output signal.

In order to address the first problem, the single-photon avalanche diode (SPAD) design known from the Lee article includes a p-well guard ring and a shallow trench isolation, cf. FIG. 1. In order to address the second problem, the SPAD includes a lateral medium trench isolation, which prevents electrical crosstalk between adjacent SPADs.

US 2015/0325737 A1 shows a different SPAD design (cf. FIG. 1), which also includes one structure for preventing edge breakdown and another structure for preventing crosstalk. In this design, edge breakdown is prevented via a p-well guard ring 24. Crosstalk protection is implemented in the form of a lateral insulation region 30 having a channel stopper region 32 and a metal region 34. The metal region 34 ensures the optical isolation from adjacent SPADs, and the channel stopper region 32 provides electrical insulation from adjacent SPADs.

The crosstalk and edge breakdown prevention structures present in the above-described designs complicate the layout and manufacturing of the avalanche photodiode. They also increase the photodiode's size and reduce its fill factor.

An object of the present disclosure is therefore to provide an avalanche photodiode, which includes a simple and space-saving way of preventing edge breakdown and of reducing crosstalk.

SUMMARY

According to the present disclosure, the above objectives are achieved with the initially-defined optoelectronic component, which is characterised by a SPAD-based reference detection device proximate to the main detection device, having the same electro-optical behaviour as the main detection device, configured to detect incoming photons and to deliver at least one reference signal based on the detected photons, and having a light inlet for incoming photons, by a neutral density filtering device covering the light inlet of the reference detection device, and by a controller configured to determine a nominal output signal based on the at least one reference signal delivered by the reference detection device and on a known optical property of the neutral density filtering device, to compare the nominal output signal with the output signal delivered by the main detection device, and, if the output signal is different from the nominal output signal, to adjust at least one operating parameter of the main detection device and of the reference detection device.

Thanks to the filter-covered reference detection device, the optoelectronic component of the present disclosure includes one or more SPADs, which will always operate in their linear detection range (i.e. below saturation), even under conditions of high light intensity. Based on the known attenuating properties of the filtering device, the associated controller can infer an expected nominal output signal from the reference signal delivered by the reference detection device. If the output signal of the main detection device does not correspond to the calculated nominal output signal, the controller concludes that the one or more SPADs of the main detection device are saturated. In this case, the controller then adjusts at least one operating parameter of the component to bring the SPAD(s) of the main detection device below saturation.

The optoelectronic component of the present disclosure can thus detect a high light intensity condition in real time and automatically adapt thereto. This ensures a reliable operation, even under bright light.

The solution of the present disclosure is particularly simple and lends itself easily to mass-production. Indeed, the additional elements needed for the real-time saturation correction can be implemented as standard and basic optical and electronic elements (conventional SPADs, conventional neutral density filters, basic controllers).

According to embodiments, the optoelectronic component of the present disclosure may include one, several or all of the following features, in all technically possible combinations:
  the controller is configured to adjust the at least one operating parameter only if the output signal is smaller than the nominal output signal;
  the controller adjusts, and in particular reduces the magnitude of the reverse-bias voltage applied to each SPAD of the main detection device and of the reference detection device;
  the same electro-optical behaviour in the main detection device and the reference detection device is achieved in that the same SPAD structure is implemented in both devices;
  the known optical property is the fractional transmittance T of the neutral density filtering device;
  the reference detection device is configured to deliver a single reference signal, and the neutral density filtering device consists of a single neutral density filter, and the controller calculates the nominal output signal using the following formula: $Sn=Sr/T$;
  both the main detection device and the reference detection device each comprise a single SPAD to detect incoming photons, a recess, the SPAD being arranged at the bottom of the recess, and readout electronics for processing the SPAD signal delivered by the SPAD;
  both the main detection device and the reference detection device are integrated into a single semiconductor package;
  a SPAD array, a first portion of the SPAD array being part of the main detection device, and the remaining portion of the SPAD array being part of the reference detection device;
  the neutral density filtering device consists of a single neutral density filter covering the remaining portion of the SPAD array;
  the neutral density filtering device consists of at least two separate neutral density filters covering the remaining portion of the SPAD array;
  the filters have the same fractional transmittance T;
  each filter has a different fractional transmittance T.

According to the present disclosure, this object is achieved with the initially-defined avalanche photodiode in that the isolation trench includes an encasement made of a dielectric material and a metallic core surrounded by the dielectric encasement, and in that the thickness of the isolation trench is larger than or equal to $9/10$ of the thickness of the second well-shaped semiconductor layer, the isolation trench thus forming a deep trench isolation within the second well-shaped semiconductor layer.

By substantially increasing the depth of the isolation trench and fitting the trench with a metallic core, the confinement of the electric field to the avalanche region is improved. At the same time, the dielectric encasement of the deep trench acts as a shield against electrical crosstalk, while the metallic core acts as a shield against optical crosstalk.

The deep isolation trench of the present disclosure doubles as a crosstalk reducing and as an edge breakdown prevention structure, thus saving space and reducing complexity.

According to embodiments, the avalanche photodiode of the present disclosure may include one, several or all of the following features, in all technically possible combinations:
  the photodiode is of the Silicon On Insulator (SOI) type;
  the isolation trench is in direct lateral contact with the outer boundary of the first shallow semiconductor layer;
  the photodiode lacks any edge breakdown preventing semiconductor guard ring;
  the metallic core includes at least one, and in particular three plate-shaped metallic elements;
  the main longitudinal axis of each plate-shaped metallic element extends along the main direction of light entry into the photodiode;
  the metallic core includes at least two plate-shaped metallic elements, and the plate-shaped metallic elements are arranged concentrically within the dielectric encasement;
  the metallic core includes at least two plate-shaped metallic elements, and each plate-shaped metallic element is spaced apart from its neighbouring plate-shaped metallic elements;
  the space between the plate-shaped metallic elements is taken up by the dielectric material of the dielectric encasement;
  the metallic core is made of tungsten, nickel, or titanium or a silicide of tungsten, nickel or titanium;
  the dielectric encasement is made of silicon dioxide;
  at least $2/3$ of the width of the isolation trench are taken up by the dielectric encasement;
  an additional outer dielectric isolation trench, which is located on the photodiode's outer edge;
  the thickness of the outer isolation trench is equal to the thickness of the second well-shaped semiconductor layer;
  the metallic core is electrically insulated from the rest of the photodiode;
  the photodiode is of the backside-illuminated type;
  an enrichment layer embedded in the first shallow extrinsic semiconductor layer;
  the outer periphery of the enrichment layer radially touches the inner periphery of the dielectric encasement of the dielectric isolation trench;
  the thickness of the enrichment layer is the same as the thickness of the first shallow extrinsic semiconductor layer.

The present disclosure also pertains to a method of manufacturing a photodiode as defined above.

The present disclosure also relates to an optical sensor comprising an integrated assembly of a photodiode as defined above and an IC chip including electronic circuitry for the control and readout of the photodiode.

The present disclosure also relates to an optical detector, such as a silicon photomultiplier, including an array of photodiodes as defined above.

BRIEF DESCRIPTION OF THE DRAWINGS

Various embodiments of the present disclosure will now be described in more detail, with reference to the accompanying drawings, in which:

FIG. 1 is a cross-sectional view of a first embodiment of a photodetecting optoelectronic component according to the present disclosure;

FIG. 2 is a block diagram illustrating the signal processing and automatic operating parameter adjustment performed by the photodetecting optoelectronic component of FIG. 1.

FIG. 4 is a schematic cross-section of a first embodiment of a semiconductor avalanche photodiode according to the present disclosure;

FIG. 5 is a variant of the semiconductor avalanche photodiode of FIG. 4 with some added features;

DETAILED DESCRIPTION

Figure 3A:
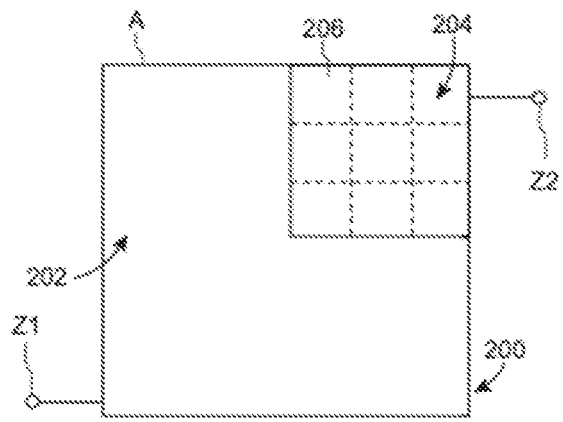
FIGS. 3A-3C show a second, third and fourth embodiment, respectively, of a photodetecting optoelectronic component of the present disclosure.

FIG. 1 shows a first embodiment 100 of an integrated photodetecting optoelectronic semiconductor component of the present disclosure. The component 100 is a self-contained optical detector. It is a small unit, typically on the millimetre scale, which can be built into various electronic equipment, such as a smart phone, a wearable, or a virtual reality headset, to act as a light sensor.

The photodetector 100 of FIG. 1 is particularly suitable for applications requiring detection under bright ambient light conditions. It is also well adapted to light detection applications in environments which are characterised by substantial and varying amounts of background light.

The photodetector 100 of FIG. 1 can for example be used as an infrared light sensor for eye tracking in virtual reality glasses.

With reference to FIG. 1, the photodetecting optoelectronic component 100 includes a SPAD-based main detection device 102 with a main SPAD 120a, a SPAD-based reference detection device 104 with a reference SPAD 120b, a neutral density filtering device 106 and a microcontroller 108.

The main detection device 102 is located in a first half 110 of a semiconductor package 112, while the reference detection device 104 is located in a second half 114 of the semiconductor package 112. Accordingly, the reference detection device 104 is arranged proximate to the main detection device 102. The main detection device 102, as well as the reference detection device 104 are both identified by a respective dashed polygon in FIG. 1.

The main detection device 102 and the reference detection device 104 are located in a side-by-side relationship to each other. Furthermore, in the present example, the main detection device 102 and the reference detection device 104 merge into one another. In other words, they are different sections of an integral monolithic block B. The block B has a front side 116, which is the area of entry for light L that is to be detected by the optoelectronic component 100. A back side 118 of the block B is located opposite to the light entry side 116.

The neutral density filtering device 106 is arranged on top of the reference detection device 104. The main detection device 102 is free of any neutral density filtering device.

The neutral density filtering device 106 may take the form of a single material layer. In the embodiment of FIG. 1, there is one sheet-like neutral density filter 106 on the front side 116 of the optoelectronic component 100. Neutral density filter 106 attenuates the intensity of all wavelengths of light equally. Hence, the intensity of light exiting the neutral density filter 106 is lower compared to the intensity of light entering the neutral density filter 106. Accordingly, because of the presence of the neutral density filter 106 in front of the reference detection device 104, the intensity of the light reaching the reference SPAD 120b is substantially lower than the intensity of the light reaching the main SPAD 120a.

The neutral density filter 106 is chosen to have specific optical properties. In particular, the neutral density filter 106 has a specific fractional transmittance T. The fractional transmittance T of the neutral density filter 106 may range from $10^{-8}$ to 0.9, depending on the requirements that must be fulfilled by the optoelectronic component 100.

The microcontroller 108 is embedded in the monolithic block B, and in particular in the semiconductor package 112.

Both the main detection device 102 and the reference detection device 104 comprise the following elements:
- One single-photon avalanche diode or SPAD 120a, 120b to detect incoming photons;
- A recess 122a, 122b, the respective SPAD 120a, 120b being arranged at the bottom of the recess; and
- readout electronics 124a, 124b for processing the SPAD signal delivered by the respective SPAD 120a, 120b.

Both recesses 122a and 122b are open cavities, which are defined in the bulk of the semiconductor package 112.

In the present embodiment, readout electronics 124a and 124b are embedded in the semiconductor package 112. Each readout electronics 124a, 124b may be arranged below its corresponding SPAD 120a, 120b.

The main SPAD 120a of the main detection device 102 and the reference SPAD 120b of the reference detection device 104 are identical. This means that they are of the same type and thus have the same structure. For example, both SPADs 120a and 120b may have been fabricated with the same manufacturing process. Accordingly, the main detection device 102 and the reference detection device 104 have the same electro-optical behaviour.

Furthermore, each detection device 102 and 104 also includes a protective cover device 126a and 126b. The two protective cover devices 126a, 126b are part of an overall cover layer C. The cover layer C extends over the entire top side 116. The cover layer C may be completely transparent to light radiation L across the entire light spectrum covered by the optical detector 100. Alternatively, the protective layer C may act as an optical filter, e.g., a bandpass, shortpass or longpass filter.

Both detection devices 102 and 104 also have a light inlet 128a and 128b. Each light inlet 128a, 128b corresponds to the section of the protective cover device 126a, 126b, which seals the top of the respective recess 122a, 122b.

The neutral density filter 106 covers the light inlet 128b of the reference detection device 104.

FIG. 2 is a block diagram illustrating the signal processing and SPAD control carried out by the optoelectronic component 100. One can distinguish the main SPAD 120a and the reference SPAD 120b, a readout electronics 124, and the microcontroller 108. The neutral density filter 106 that attenuates the light L before it reaches the reference SPAD 120b is also shown. Each SPAD 120a and 120b has a power supply 130a and 130b. The power supply 130a, 130b sets the reverse-bias voltage applied to its respective SPAD 120a, 120b.

In the example shown in FIG. 2, both SPADs 120a, 120b share the same readout electronics 124. This means that one and the same readout electronics sequentially processes first the signal from one of the two SPADs and then the signal from the other SPAD. Alternatively, each SPAD 120a, 120b may have its own dedicated readout chain. In this case, one may then have two parallel identical readout chains 124a and 124b (cf. FIG. 1). This allows a simultaneous readout of the signals of both SPADs.

FIG. 2 shows the readout electronics 124 as including three consecutive stages, namely a filter and amplification stage 132, followed by a comparator or discriminator stage 134, followed by an analogue to digital converter (ADC) or counter 136. The filter and amplification stage 132 is optional. It may be left out since SPADs already have a built-in intrinsic signal gain.

The readout chain 124 has a signal input section I and a signal output section O. The signal input section I receives a signal from one of the two SPADs 120a, 120b. This signal is then processed by the three stages 132, 134 and 136 of the readout electronics 124. The result is a detection signal Sr or So at the signal output section O.

The combination of the main SPAD 120a and the readout electronics 124 acts as the main detection device 102 and delivers an output signal So that is indicative of the intensity of light L which irradiates the optoelectronic component 100. The combination of the reference SPAD 120b and the readout electronics 124 acts as the reference detection device 104 and delivers a reference signal Sr. Both the reference signal Sr and the output signal So are provided to the microcontroller unit 108 for further processing.

The microcontroller unit 108 is adapted to control the power supplies 130a, 130b of the two SPADs 120a, 120b. In particular, the microcontroller unit 108 can control the two power supplies 130a, 130b to modify the magnitude of the reverse-bias voltage applied to each SPAD 120a, 120b.

We will now describe the control process carried out by the microcontroller 108. This control process is an automatic SPAD saturation assessment and correction, which ensures that the photodetector 100 always operates in its linear detection range. The control process may be re-iterative, meaning that it may be carried out regularly in a cycling manner.

The control process starts with both the reference SPAD 120b and the main SPAD 120a being biased at the same reverse voltage. The intensity of light L stemming from a light source Q is measured by both the main detection device 102 and the reference detection device 104. The resulting signals So (output signal from the main detection device 102) and Sr (reference signal from the reference detection device 104) are both fed into the microcontroller 108. The microcontroller 108 then determines a nominal output signal Sn based on the reference signal Sr and the fractional transmittance T of the neutral density filter 106. More specifically, the controller 108 calculates the nominal output signal Sn using the following formula:

$$Sn = Sr/T.$$

Then, the controller 108 compares the calculated nominal output signal Sn with the output signal So delivered by the main detection device 102.

If the output signal So is smaller than the nominal output signal Sn, the controller concludes that the main SPAD 120a is operating under saturation conditions. In this case, the microcontroller 108 lowers the reverse-bias voltage of both SPADs 120a and 120b to bring the main SPAD 120a out of saturation.

The reverse-bias voltage may be lowered in specific increments (e.g. in increments of 1 V) until the nominal output signal Sn is equal to the output signal So.

When both signals Sn and So are equal, the controller 108 concludes that the main SPAD 120a now operates in its linear detection range. The corresponding output signal So is the signal provided by the optoelectronic component 100 as an accurate indication of the intensity of the light which irradiates the component.

As already mentioned, the control process may be repeated on a regular basis. This allows real-time monitoring of intensity variations in the light L coming from the light source Q and, if needed, a corresponding real-time SPAD saturation correction in the optoelectronic component 100.

Figure 3B:
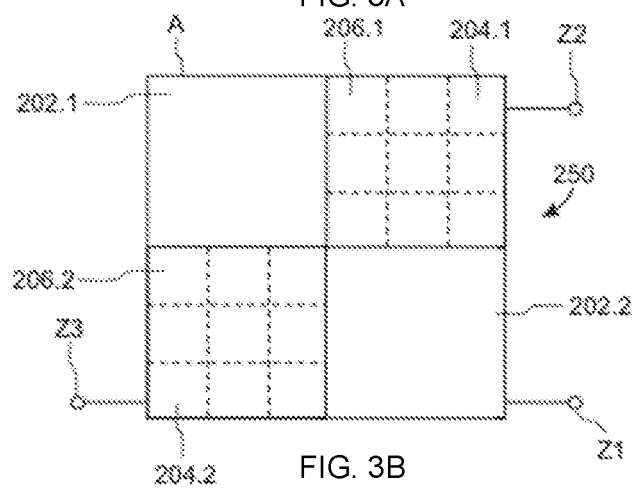
Figure 3C:
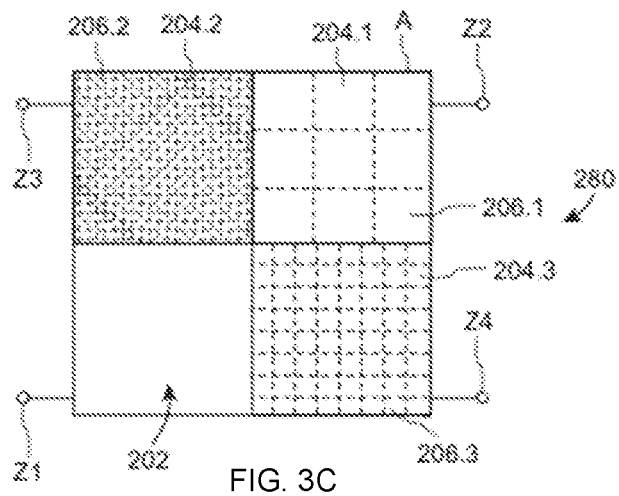

With reference to FIGS. 3A-3C, we will now describe three further embodiments of the optoelectronic component of the present disclosure. The three embodiments shown in FIGS. 3A-3C are all based on a whole array A of single photon avalanche diodes (SPADs). This is in contrast to the embodiment of FIG. 1, which uses two single SPADs. In essence, in the embodiments of FIGS. 3A-3C, the two single SPADs of the first embodiment are each replaced by a whole set of SPADs. The different SPAD sets together form a complete SPAD array A, such as a silicon photomultiplier (SiPM).

In the second embodiment 200 shown in FIG. 3A, the SPAD array A is subdivided into a first portion 202 and a second remaining portion 204. The first portion 202 corresponds to the main detection device, and the remaining portion 204 corresponds to the reference detection device. The signal delivered by the main SPAD set 202 is read out via a main output contact Z1. The signal delivered by the reference SPAD set 204 is read out via a reference output contact Z2. In this embodiment, the neutral density filtering device consists of a single neutral density filter 206, which covers the reference portion 204 of the SPAD array A. Both contacts Z1 and Z2 are connected to readout electronics, as shown in FIG. 2. Based on the signal provided by the contact Z1, the readout electronics generates the output signal So. Based on the signal provided by the reference contact Z2, the readout electronics generates the reference signal Sr. The same control process as described above is then carried out to ensure that the main SPAD set 202 always operates in the linear detection range, below saturation.

In the third embodiment 250 shown in FIG. 3B, the main detection device comprises two sub-portions 202.1 and 202.2 of the SPAD array A, which together form the overall main detection portion. Likewise, the reference detection device comprises two other sub-portions 204.1 and 204.2 of the SPAD array A, which together form the overall reference detection portion. Here, the neutral density filtering device consists of two separate neutral density filters 206.1 and 206.2, which cover the reference sub-portion 204.1 and 204.2, respectively. Both neutral density filters 206.1 and 206.2 have the same fractional transmittance T. Each reference sub-portion 204.1 and 204.2 of the reference detection device has its own output contact Z2 and Z3. The two signals stemming from these two different contacts Z2 and Z3 may be averaged or considered separately. This kind of setup may be advantageous in applications with a non-uniform optical flux.

In the fourth embodiment 280 shown in FIG. 3C, the SPAD array A is divided into four quadrants, each with its own output contact Z1 to Z4. One of the quadrants, labelled 202, corresponds to the main detection device, and is free of any neutral density filter. The three other quadrants 204.1, 204.2 and 204.3 correspond to the reference detection device. The three quadrants for reference detection are each covered by a separate neutral density filter 206.1, 206.2 and 206.3. Each filter 206.1, 206.2 and 206.3 has a different fractional transmittance T. The fractional transmittance T may decrease from one filter to the next. The signals produced by the three filter-covered quadrants 204.1, 204.2 and 204.3 can be read individually and the control process described above can be extended to all the collected signals. This allows a more accurate estimate of the saturation state in a wider set of application conditions.

In all three embodiments shown in FIGS. 3A-3C, besides the output contacts Z1, Z2, etc., the SPAD array A also has an additional common contact (not shown), which is shared by all portions or quadrants. This common contact may be located on the backside of the SPAD array A.

Summarising, the SPAD-based photodetecting optoelectronic components of the present disclosure include a simple, cost-effective, compact and fast solution for the online monitoring, assessment and potential correction of SPAD saturation. The present solution is compatible with standard CMOS technology. Furthermore, with the present solution, SPAD detectors can be used in a wider range of applications (especially in the consumer area), even for high impinging photon fluxes. The solution is also compatible with all the state-of-the-art SPAD quenching mechanisms.

The present disclosure further relates to improvements in avalanche photodiodes, and in particular in single photon avalanche diodes, or SPADs, which are also known as Geiger mode avalanche photodiodes.

Thanks to their high sensitivity, very fast timing response and large intrinsic gain, the SPADs of the present disclosure can be used in a lot of different applications, such as time-of-flight measurements, LiDAR, user detection, optical recognition, heart rate monitoring, or functional near-infrared spectroscopy, to name a few.

The SPADs of the present disclosure may also be arranged in arrays to use them for larger imaging applications. A silicon photomultiplier is a typical example of an optical detector that may be constructed with the present SPADs. Using the SPADs of the present disclosure leads to detector arrays having a high fill factor and a high pixel density. This reduces the detector's size and enables much better photon statistics and high quality imaging. This is due to the fact that the SPADs of the present disclosure are backside-illuminated SPADs. In this type of SPADs, the light to be detected enters the photodiode from its back instead of its front.

The backside-illuminated SPADs of the present disclosure may be fabricated using silicon on insulator (SOI) technology, and optionally compatible with complementary metal oxide semiconductor (CMOS) technology.

Turning now to FIG. 4, we will describe a first embodiment of a single photon avalanche diode 100 according to the present disclosure. The SPAD structure 100 shown in FIG. 4 includes, from the bottom B to the top T, a handling layer 102, a bottom oxide layer 104, a PN junction 106, a field oxide layer 108, a cathode contact 110 and an anode contact 112.

The handling layer 102 is typically a semiconductor layer, e.g. an n-type layer. Strictly speaking, this n-type layer 102 is not part of the final avalanche photodiode 100. It is part of a handling wafer used during the manufacturing process and is removed during a wafer backside etching process.

The SPAD 100 shown in FIG. 4 is manufactured in SOI technology, wherein the bottom oxide layer 104 corresponds to the insulator, and the PN junction 106 to the semiconductor on the insulator.

In the present example, the PN junction 106 takes the form of a first shallow extrinsic semiconductor layer 114 with a first type of doping, which is embedded in a second well-shaped extrinsic semiconductor layer 116 with a second type of doping opposite to the first type of doping.

In the present example, the first shallow semiconductor layer 114 is a p+-type layer. Accordingly, the second well-shaped semiconductor layer 116 is an n-type layer. The PN junction 106 is thus made of a lower layer 116 and an upper layer 114. The thickness of the second well-shaped semiconductor layer 116 is referenced with the letter D. A typical range for D is 2 to 10 µm. Compared thereto, the p+-type layer 114 is much thinner and has a thickness of e.g. between 0.1 and 1 µm. Hence, the thickness of the shallow semiconductor layer 114 is typically between 5 to 10% of the thickness of the well-shaped semiconductor layer 116.

The well-shaped second semiconductor layer 116 can be subdivided, in the transverse direction Q, into a central light absorption region 118, an intermediate isolation region 120, and an outer contacting region 122. The shallow semiconductor layer 114 sits on top of the central light absorption region 118. The shallow semiconductor layer 114 is in direct contact with the underlying absorption region 118 of the well-shaped semiconductor layer 116. The intermediate isolation region 120 has a dielectric isolation trench 124 integrated therein. The outer contacting region 122 is provided with a local enrichment area 126, which, in the present example, is of the n+-type. The local enrichment area 126 guarantees a good electrical contact for the cathode 110.

The SPAD 100 can also be described as including a multiple-layer stack with a bottom insulating layer 104, an adjacent intermediate semiconductor layer 106 (which corresponds to the PN junction), and a top insulating layer 108. The semiconductor layer 106 is thus sandwiched between the two insulating layers 104 and 108.

The cathode contact 110, as well as the anode contact 112 are both implemented as discontinuities in the top field oxide/insulating layer 108. In the present embodiment, the cathode contact 110 and the anode contact 112 are concentrically arranged. The cathode contact 110 surrounds the anode contact 112 in the same way as the outer contacting region 122 of the well-shaped layer 116 surrounds the shallow layer 114.

The semiconductor avalanche photodiode 100 also comprises an avalanche region A at the interface between the two semiconductor layers 114 and 116 (cf. the dashed rectangle in FIG. 4). When the SPAD 100 is biased at an operating voltage above its breakdown voltage, the avalanche region A is adapted to undergo avalanche breakdown when triggered by photons M, which have entered the SPAD 100 from the bottom side B. The avalanche region A is electrically confined by the isolation trench 124.

The dielectric isolation trench 124 extends into the second well-shaped semiconductor layer 116. It surrounds the entire outer periphery of the avalanche region A to prevent premature edge breakdown in the SPAD 100. The isolation trench 124 may have a closed circular or polygonal shape when seen from the top T of the SPAD 100. The depth or thickness X of the isolation trench 124 is defined as the distance from the upper surface 128 of the well-shaped layer 116 to the lower base 130 of the isolation trench 124. The isolation trench 124 is a so-called deep isolation trench. This means that the isolation trench 124 extends deeply into the well-shaped layer 116. According to the present disclosure, the thickness X of the isolation trench 124 is larger than or equal to 9/10 of the thickness D of the second well-shaped semiconductor layer 116. This minimum thickness of the deep isolation trench 124 in relation to the well 116 ensures an adequate confinement of the avalanche region A to the active area of the SPAD 100. This has been confirmed by numerical simulations. The deep isolation trench 124 is an effective edge breakdown preventing device.

One will note that the deep isolation trench 124 is arranged in-between the outer cathode contact 110 and the inner anode contact 112. Hence, when starting from the centre of the SPAD 100, and moving outwards radially therefrom, one will first encounter the anode contact 112, then the deep isolation trench 124, and finally the outer cathode contact 110.

As apparent from FIG. 4, the width W of the deep isolation trench 124 is smaller than its thickness X. The width of the deep isolation trench 124 can be of the order of 0.5 μm.

One will note that the deep isolation trench 124 is in direct lateral contact with the outer boundary 136 of the first shallow semiconductor layer 114.

According to the present disclosure, the isolation trench 124 includes an encasement 132, made of a dielectric material, and a metallic core 134, surrounded by the dielectric encasement 132. The encasement 132 may e.g. be made of a semiconductor oxide such as silicon dioxide. The metallic core 134 may for example be made of tungsten.

In the present example, the metallic core consists of a plate-shaped metallic element 134. The main longitudinal axis L of the plate-shaped metallic element 134 extends along the main direction M of light entry into the SPAD 100 (cf. the arrows). The metallic core 134 can also be qualified as a field plate since it confines the electrical field in the PN junction 106. This barrier field plate 134 is electrically insulated from the rest of the SPAD 100. The electrical insulation is provided by the dielectric encasement 132 and the field oxide layer 108. Since the field plate 134 is electrically insulated, it is not connected to any reference voltage and thus a floating field plate.

It will be noted that the upper edge 135 of the metal plate 134 may protrude out of the encasement 132 and into the top field oxide layer 108.

At least 2/3 of the width W of the deep isolation trench 124 may be taken up by the dielectric encasement 132.

One particular advantage of the SPAD 100 shown in FIG. 4 is that it does not need any edge breakdown preventing semiconductor guard ring as in the prior art. According to the present disclosure, edge breakdown is prevented thanks to the substantial depth of the isolation trench 124 in combination with the metallic core 134.

On top of that, the metallic core 134 acts as an optical barrier for secondary photons P emitted in the PN junction 106. Those parasitic secondary photons P are an unwanted side-effect that occurs during the operation of the SPAD 100. Electroluminescence in the PN junction 106 generates photons, which may propagate through the SPAD 100 into the surroundings (so-called optical crosstalk). This is prevented by the metal barrier field plate 134.

Furthermore, the dielectric encasement 132 acts as an electrical barrier, which prevents electric charge carriers from propagating into the SPAD's surroundings (so-called electrical crosstalk).

FIG. 5 shows a variant of the first embodiment of FIG. 4. Compared to the embodiment of FIG. 4, the SPAD structure 200 of FIG. 5 has two additional features: a p+-type enrichment layer 238 and an additional outer dielectric isolation trench 240.

The p+-type enrichment layer 238 is embedded in the shallow semiconductor layer 214. This p+-type enrichment layer 238 guarantees a good electrical contact between the anode contact 212 and the shallow p+-type semiconductor layer 214. In an embodiment, th outer periphery of the p+-type enrichment layer 238 radially touches the inner periphery of the dielectric encasement 232 of the inner dielectric isolation trench 224. As a variant not shown in FIG. 5, the thickness of the p+-type enrichment layer 238 may be the same as the thickness of the shallow layer 214. This may reduce possible charging effects at the p-n junction 206, which can be due to the fixed charge in the encasement 232.

This optional p+-type enrichment layer 238 on the upper periphery of the shallow semiconductor layer 214 is advantageous in consideration of the typically high n-type doping of the well-shaped epitaxial layer 216.

The outer dielectric isolation trench 240 is located on the SPAD's outer lateral edge. It surrounds the extrinsic semiconductor well 216 of the PN junction 206. The additional outer dielectric isolation trench 240 is sandwiched between the bottom oxide layer 204 and the top field oxide layer 208.

In an embodiment, as shown in FIG. 5, the thickness of the outer isolation trench 240 is equal to the thickness D of the second well-shaped semiconductor layer 216. The additional outer dielectric isolation trench 240 ensures a full electrical decoupling from adjacent pixels when the SPAD structure 200 is used in a SPAD array.

Figure 6:
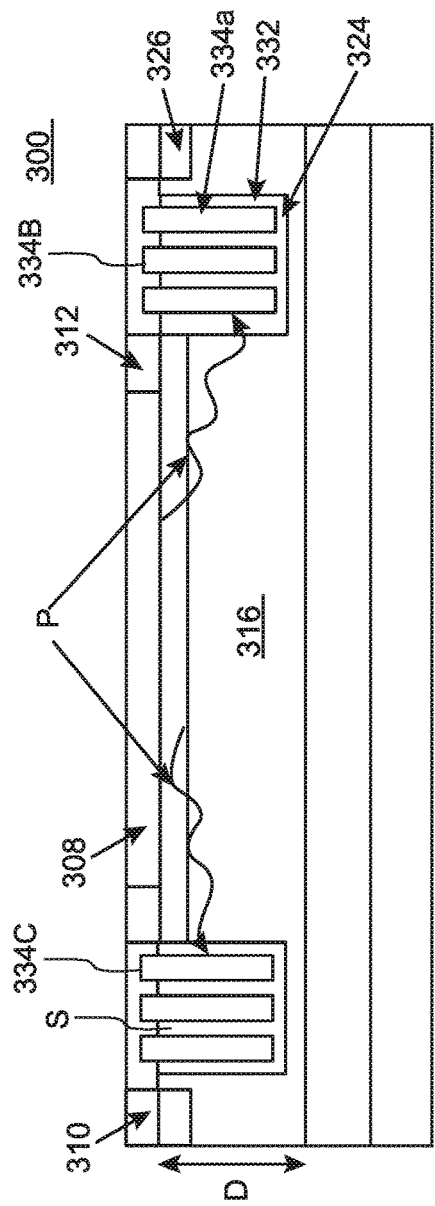
FIG. 6 is a schematic cross-section of a second embodiment of a semiconductor avalanche photodiode according to the present disclosure.

We will now turn to FIG. 6, which shows a second embodiment 300 of a SPAD structure of the present disclosure. The only difference with respect to the first embodiment is the presence of more than one plate-shaped metallic element in the dielectric encasement 332. In the embodiment shown in FIG. 6, the encasement 332 contains three plate-shaped metallic elements 334a, 334b and 334c. In the present example, the three barrier plates 334a to c are arranged concentrically within the dielectric encasement 332. The three metallic plates 334a to c are spaced apart from each other. The space S between the metallic plates 334a to c is taken up by the dielectric material of the dielectric encasement 332. Accordingly, the three barrier plates 334a to c are encapsulated in a dielectric sheathing. This sheathing may exclusively consist of the encasement 332. Alternatively, and as shown in FIG. 6, the sheathing may consist of a combination of the encasement 332 and a section of the top field oxide layer 308.

Figure 7:
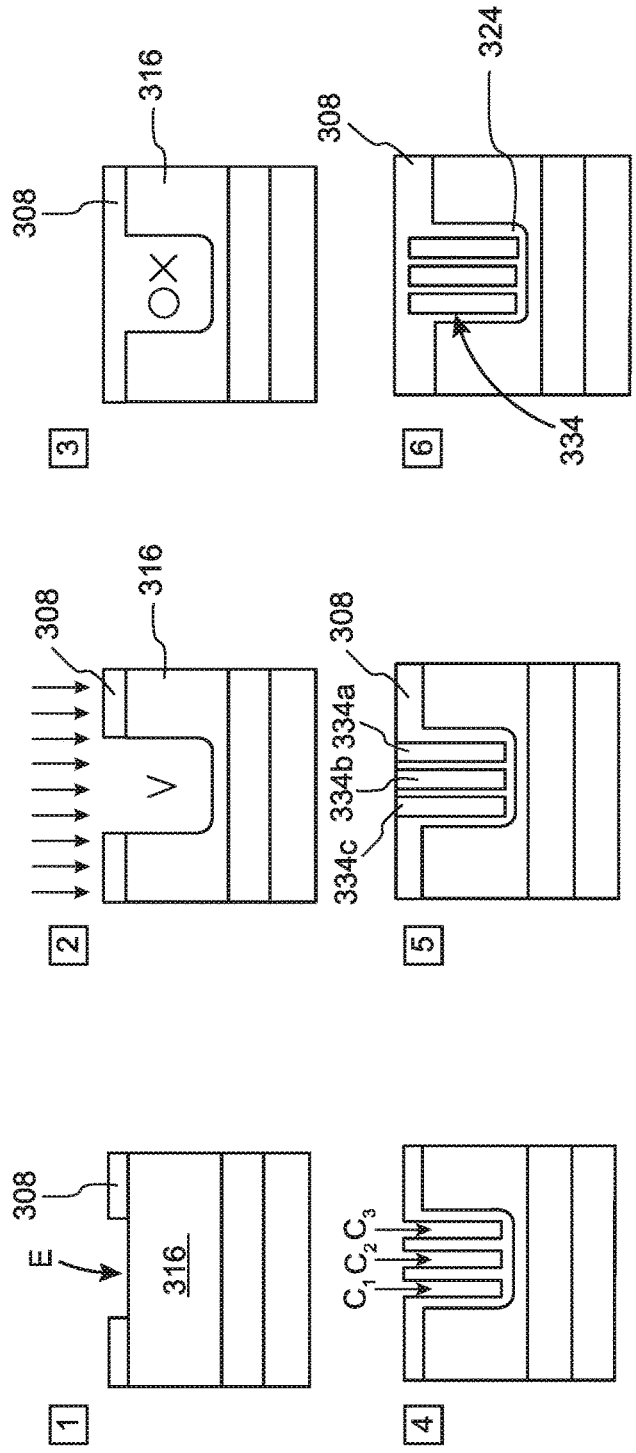
FIG. 7 illustrates the process steps of fabricating the deep trench isolation with vertical floating field plates according to the present disclosure.

FIG. 7 shows the process steps that may be carried out during the manufacture of the SPAD 300 of FIG. 6 in order to fabricate the deep isolation trench 324. FIG. 7 shows a total of six process steps.

In step 1, a section E of the field oxide layer 308 is removed in order to lay bare a region of the well 316. This is done by photoresist deposition, followed by a photomask process, followed by a dry etch of the field oxide layer 308 and finally a removal of the photoresist.

Step 2 is a dry etching of the well 316. This creates a void V in the well 316 for the isolation trench 324. In this step, the field oxide layer 308 acts as a hard mask.

In step 3, semiconductor oxide is thermally grown inside the void V until the void V is completely filled by an oxide layer OX. Alternatively, this filling of the void V may be done by deposition. This third step terminates when the void filling oxide layer OX is flush with the field oxide layer 308.

In step 4, three cavities C1, C2 and C3 are etched into the oxide layer OX. This is done by deposition of a photoresist, followed by a photomask process, followed by dry etching, and finally by the removal of the photoresist.

In step 5, a metal such as tungsten is deposited inside each of the cavities C1, C2 and C3. The metal deposition ends when the top end of each of three metal layers is flush with the top surface of the field oxide layer 308. The result is the three field plates 334a to 334c. This step involves the deposition of a temporary metal barrier (e.g., made of titanium or titanium nitride) to shield the upper surface of the photodiode 300 except the three cavities C1, C2 and C3, followed by the tungsten deposition to fill the cavities C1, C2 and C3, followed by an etchback of the excess tungsten, and finally the etchback of the temporary metal barrier.

The last step (step 6) consists of the deposition of supplementary semiconductor oxide to planarise the top surface of the SPAD 300 and to fully encase the metal core 334 of the isolation trench 324.

Figure 8:
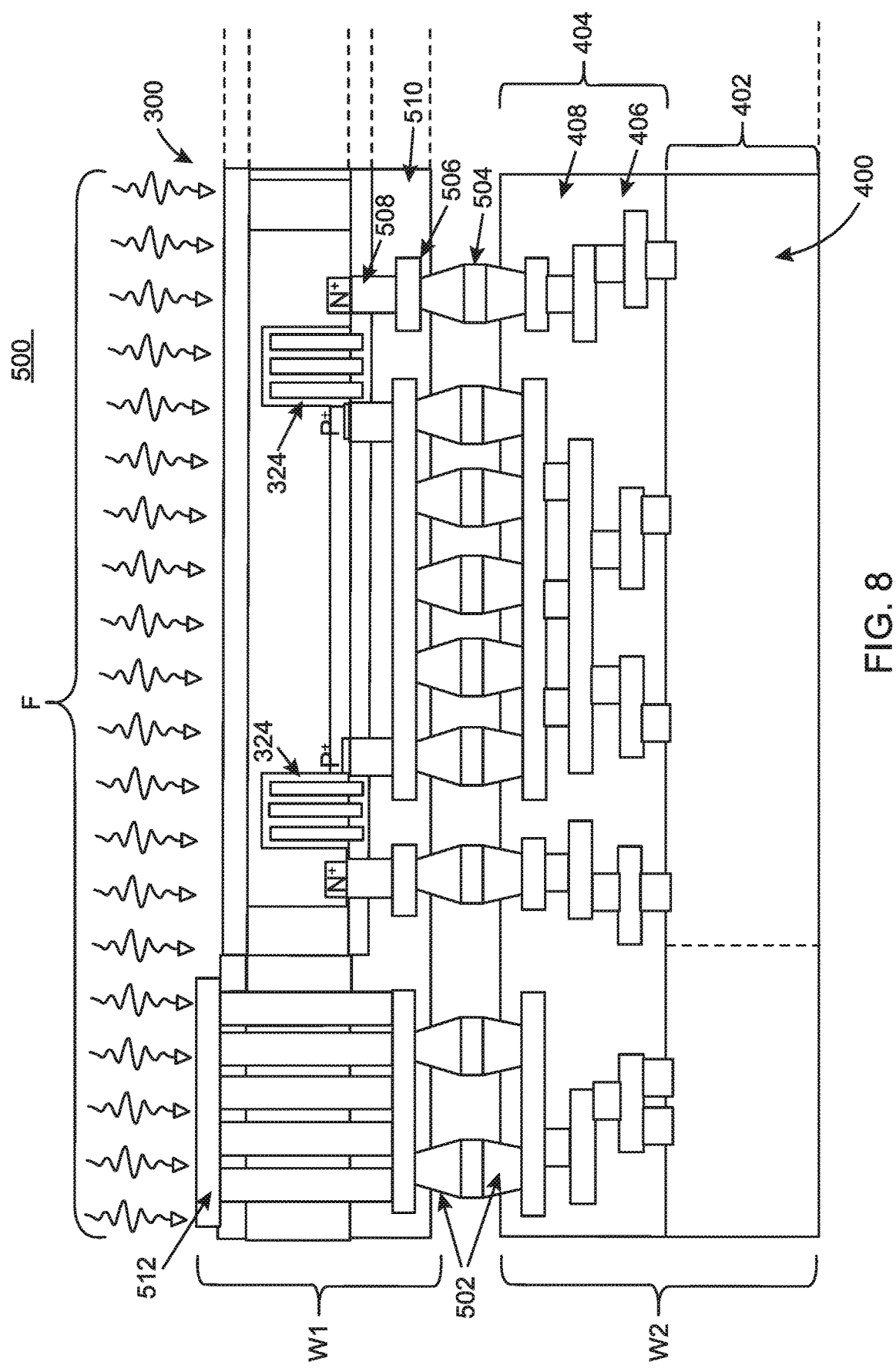
FIG. 8 is a schematic cross-section of an optical sensor with an integrated avalanche photodiode and IC chip according to the present disclosure.

FIG. 8 shows how the SPAD 300 of FIG. 6 may be integrated with an IC chip 400 to form an optical sensor 500. The optical sensor 500 shown in FIG. 8 is a fully integrated solution of an SOI SPAD with CMOS electronics, which is suitable for high quality 3D imaging. FIG. 8 shows the optical sensor 500 as part of two mutually bonded semiconductor wafers W1 and W2. The upper semiconductor wafer W1 contains an array of identical SPADs 300. Each SPAD 300 of the array represents one pixel of a whole optical detector. The next cell or pixel of the SPAD array and the corresponding CMOS electronics are represented by the dashed lines on the right hand side of FIG. 8.

The bonding between the two wafers W1 and W2 is implemented via metal contacts 502 and interlayers 504. One can also distinguish metal interconnects 506 in the upper wafer W1. Illustrated as well are contacts and vias 508 and a deposited oxide layer 510.

There is a vias section 512 next to the SPAD 300. The vias section 512 includes the electrical lines, which are necessary for the power supply of and signal exchange with the IC chip 400.

The lower part 402 of the IC chip 400 includes the pixel electronics, and the upper part 404 includes multiple vias and interconnects 406, which are embedded in an oxide layer 408.

As illustrated by the wavy arrows, the optical sensor 500 is of the backside illuminated type. This means that the light to be detected enters the SPAD 300 from the back. The front side of the SPAD 300 is used for the integration with the IC chip 400, which includes the necessary readout electronics 402. Accordingly, the front side of each SPAD 300 is occluded by the associated IC chip 400.

Summarising, the SPAD structures described in the present disclosure have an innovative deep trench isolation for the prevention of edge breakdown, and at the same time, reduction of crosstalk and dark current, when the SPAD structures are used in a SPAD array.

In other words, in the SPAD structures of the present disclosure, the deep trench fulfils two different roles at the same time: on the one hand it prevents electrical and optical crosstalk, and on the other hand it prevents edge breakdown. In this way, the SPAD does not need two separate elements to achieve both effects, which increases the fill factor.

The disclosed SPAD structures can be used to fabricate high-density back-illuminated SPAD arrays, which can operate even at high overvoltage values. The resulting SPAD arrays have a high photodetection efficiency throughout the whole light spectrum, i.e. from blue to near infrared, low crosstalk and dark current and a high spatial resolution. They also have a high fill factor and an excellent electro-optical decoupling between pixels.

The present semiconductor on insulator back-illuminated SPAD design is fully compatible with CMOS technology. The resulting SPAD array detectors are suitable for high quality 3D imaging such as needed in time-of-flight applications (e.g. optical proximity sensing, LiDAR, etc.). Furthermore, the resulting SPAD array detectors can operate even under very low light conditions.

The invention claimed is:

1. A semiconductor avalanche photodiode for light detection, the avalanche photodiode comprising:
   a p-n junction comprising a first shallow extrinsic semiconductor layer with a first type of doping embedded in a second well-shaped extrinsic semiconductor layer with a second type of doping opposite to the first type of doping;
   a first electric contact configured to electrically connect the first semiconductor layer;
   a second electric contact configured to electrically connect the second semiconductor layer;
   an avalanche region at the interface between the two semiconductor layers configured to undergo avalanche breakdown when triggered by the light to be detected; and
   a dielectric isolation trench extending into the second well-shaped semiconductor layer and surrounding an outer periphery of the avalanche region to prevent premature edge breakdown in the avalanche photodiode;
   wherein the isolation trench is arranged, in a radial direction, in-between the first electric contact and the second electric contact;
   wherein:
      the isolation trench comprises an encasement made of a dielectric material and a metallic core surrounded by the dielectric encasement; and
      the thickness of the isolation trench is greater than or equal to 90% of the thickness of the second well-shaped semiconductor layer, the isolation trench thus forming a deep trench isolation within the second well-shaped semiconductor layer.

2. The photodiode of claim 1, wherein the photodiode is of the Silicon On Insulator type.

3. The photodiode of claim 1, wherein the isolation trench is in direct lateral contact with the outer boundary of the first shallow semiconductor layer.

4. The photodiode of claim 1, wherein the photodiode lacks any edge breakdown preventing semiconductor guard ring.

5. The photodiode of claim 1, wherein the metallic core comprises at least one plate-shaped metallic element.

6. The photodiode of claim 5, wherein the main longitudinal axis of the at least one plate-shaped metallic element extends along a main direction of light entry into the photodiode.

7. The photodiode of claim 5, wherein the metallic core comprises at least two plate-shaped metallic elements, and wherein the plate-shaped metallic elements are arranged concentrically within the dielectric encasement.

8. The photodiode of claim 5, wherein the metallic core comprises at least two plate-shaped metallic elements, and wherein each plate-shaped metallic element is spaced apart from its neighbouring plate-shaped metallic elements.

\* \* \* \* \*